Oct. 17, 1939.   S. ELIOT   2,176,125
MOTOR VEHICLE
Filed Dec. 14, 1935   3 Sheets-Sheet 1

INVENTOR:
Samuel Eliot,
BY
ATTORNEY

Oct. 17, 1939.　　　　S. ELIOT　　　　2,176,125
MOTOR VEHICLE
Filed Dec. 14, 1935　　　　3 Sheets-Sheet 2

INVENTOR:
Samuel Eliot,
BY
ATTORNEY

Oct. 17, 1939.  S. ELIOT  2,176,125
MOTOR VEHICLE
Filed Dec. 14, 1935  3 Sheets-Sheet 3
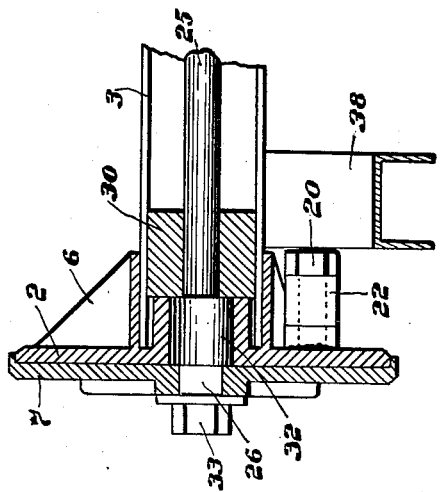
Fig. 7
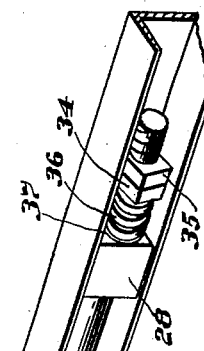
Fig. 6
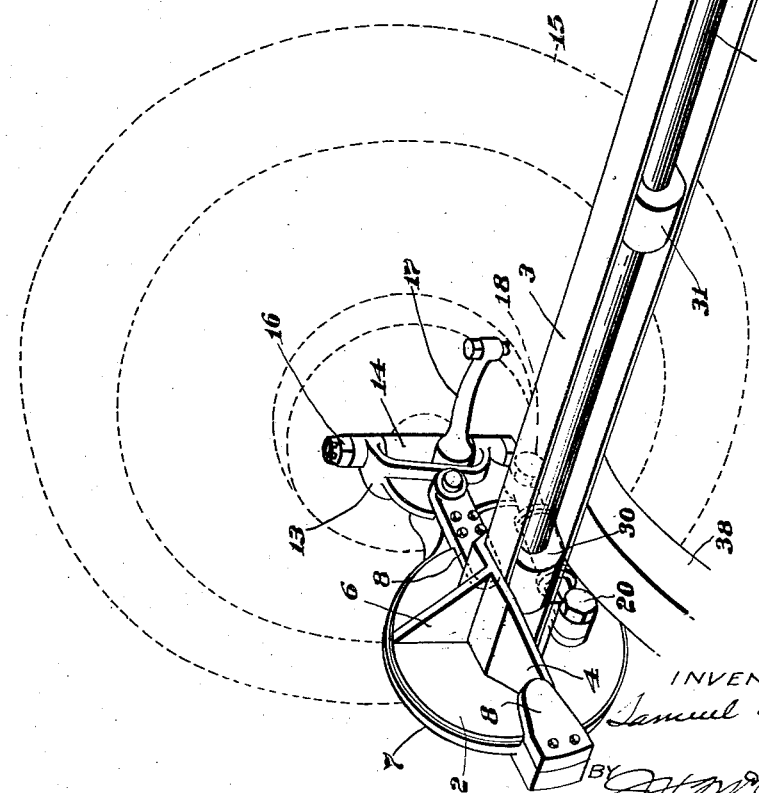
INVENTOR:
Samuel Eliot,
BY
ATTORNEY.

Patented Oct. 17, 1939

2,176,125

UNITED STATES PATENT OFFICE 2,176,125

MOTOR VEHICLE

Samuel Eliot, Brookline, Mass.

Application December 14, 1935, Serial No. 54,458

10 Claims. (Cl. 267—57)

This invention relates to motor vehicles, and is particularly concerned with the structure of the chassis. It aims to improve vehicles with a view to simplifying the chassis construction and more especially the suspension or mounting of the chassis frame on the wheels, while at the same time producing a sturdy, reliable and easy riding construction.

The nature of the invention will be readily understood from the following description when read in connection with the accompanying drawings, and the novel features will be particularly pointed out in the appended claims.

In the drawings,

Fig. 6 is a perspective view of the parts shown in Fig. 4; and

Fig. 7 is a vertical, sectional view of the supporting disk and the casing that partially encloses it.

Figure 1:
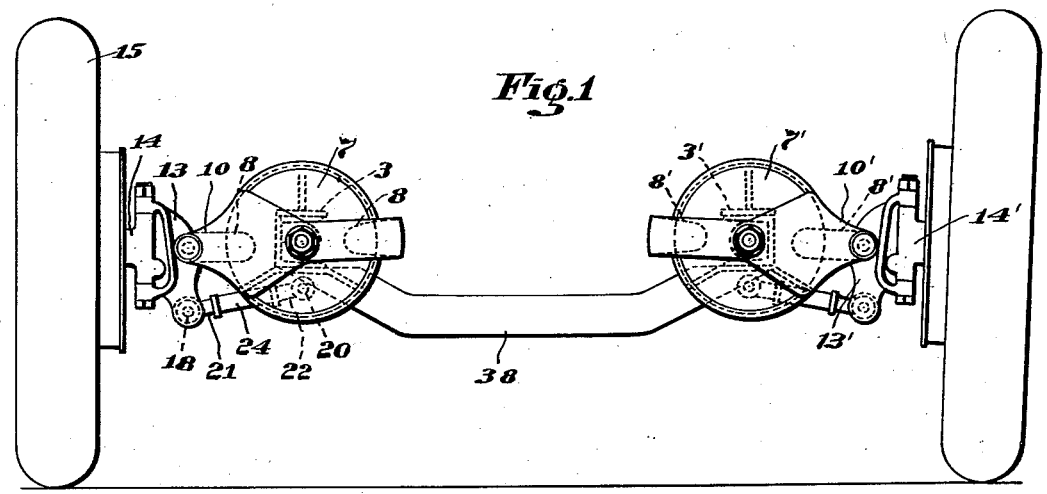
Figure 1 is a front elevation of those parts of the chassis with which the present invention is more especially concerned.

Referring first to the connections between the front right-hand corner of the frame and the adjacent front wheel, as shown more especially in Figs. 1 and 4 to 7, inclusive, it will be seen that a circular disk 2 is welded or otherwise rigidly secured to the forward end of the side channel beam 3 of the chassis frame. Preferably this disk is secured to the frame by means of angle plates or ribs, such as those shown at 4, 5 and 6, these parts serving both to increase the strength, stiffness and rigidity of the disk and also to radiate heat from it. Closely encircling this disk and enclosing it, except at its rearward side, is a casing, indicated in general at 7, but also including arms 8—8 bolted to the main casing member and overlying the rearward side of the disk. This arrangement secures the disk and the casing together against relative movement in any direction except a rotative movement of the casing around the axis of the disk. At its left-hand side, Figs. 1, 4 and 5, the casing 7 is provided with an integral arm or extension 10 which is secured by means of the pivot bolt 12 to the bracket 13. This bracket forms the supporting member for the spindle or shaft 14 on which the front wheel 15 revolves, these two parts being pivotally secured together by the usual king pin 16. The usual steering arm 17, Fig. 6, projects rearwardly from the member 14. A further connection between the parts just described and the bracket 13 is provided consisting of a link, pivoted to the bracket at 18 and to the disk 2 at 20. Preferably this link is made adjustable and for this purpose the two end members 21 and 22, respectively, are threaded on opposite ends of a screw 23, Fig. 5, and the intermediate portion of this screw between the parts 21 and 22 is covered by a sleeve 24.

Figure 5:
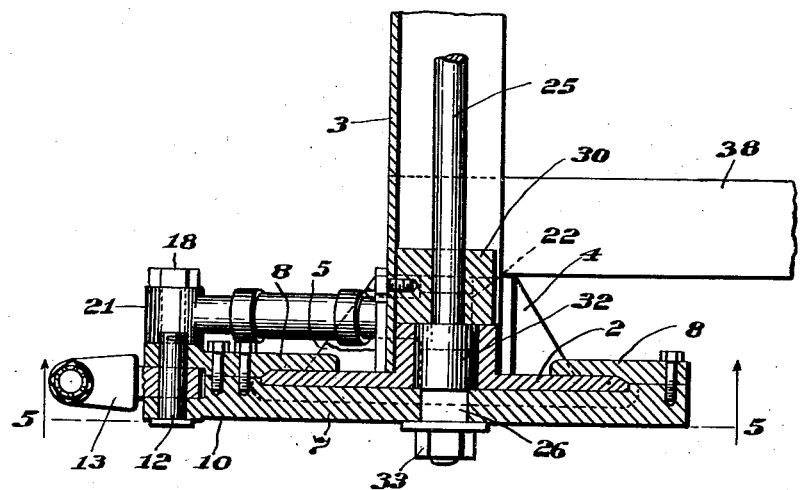
Fig. 5 is a front elevation of the parts shown in Fig. 4 with the forward end of the torsion rod in section.
Figure 5:
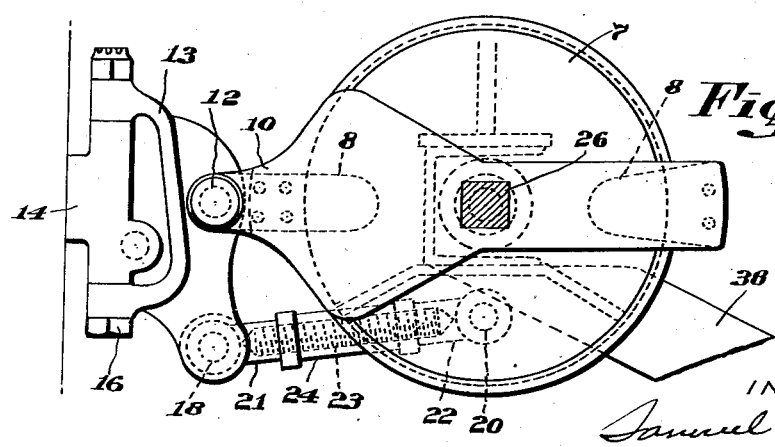

It will be clear from an inspection of Figs. 1 and 5 that in this arrangement the entire weight of the lower right-hand corner of the frame, and any parts supported by it, is transmitted to the wheel 15 through the disk 2 and casing 7. In other words, these parts support all of this weight. Also, that if this corner of the frame is moved downwardly, such a movement will be transmitted through the parts 2 and 7 and will necessarily produce a rotative movement of the casing 7 around the disk 2. This movement will be in a clockwise direction. On the other hand, if the frame 3 should be moved upwardly, a rotative movement of the casing in a counter-clockwise direction relatively to the disk 2 would occur.

This rotative movement of the casing 7 around the disk 2 is torsionally resisted by a bar or rod 25 extending longitudinally of the frame and housed in the side channel bar 3. The forward end of this rod has a square section 26 fitting into a correspondingly shaped hole in the casing 7, while its rearward end also has a square section 27 fitting snugly in a square hole in a block 28 that is secured rigidly to the channel bar 3. Between these parts the rod is laterally supported in any suitable number of bearing blocks, such as those shown at 30 and 31, Fig. 6, the fit of the rod in these blocks being sufficiently loose to permit it to rotate freely in them. It is also provided with an enlargement 32, Figs. 4 and 7, fitting loosely in the hub of the disk 2. With this arrangement, therefore, any rotative movement of the casing 7 around the disk 2 is torsionally, and therefore yieldingly, resisted by the rod 25. Thus the rod serves as a spring which resists either upward or downward movement of the chassis frame and therefore cushions these movements, performing in this respect the same functions as do the springs of the conventional automobile chassis.

Figure 4:
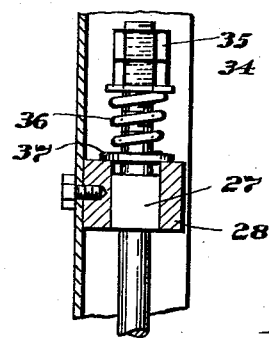
Fig. 4 is a horizontal, sectional view of the frame at the front right-hand corner.

This relative movement of the parts 2 and 7 can also be utilized to perform the functions of a shock absorber, and the degree of this action can be varied by suitable adjustment. It will be observed that in this particular construction the entire front face of the disk 2 is in contact with a similar face on the casing 7. In order to adjust the frictional resistance of these parts a nut 33, Fig. 4, is threaded on to the forward end of the torsion rod 25 and another nut 34, together with a check nut 35, are threaded on to the rearward end of this member, a strong coiled spring 36 and a washer 37 being interposed between these nuts and the block 28 so that the rod is forced backwardly by the spring 36 and thus the rear face of the member 7 is pressed yieldingly against the front face of the disk 2. The degree of this pressure can be varied by suitable adjustment of the nuts 34 and 35. Thus the frictional resistance between the parts 2 and 7 can be regulated. It is contemplated that oil or other lubricant will be maintained constantly between these friction surfaces to reduce wear.

The construction above described at the front right-hand corner of the frame is, of course, duplicated at the opposite left-hand corner, as shown in Fig. 1, and parts corresponding to those above described are designated by the same, but primed, numerals. The side members 3—3' are connected at the front of the frame by a cross member or bar 38, and at the rear of the frame by the rear axle housing 40, Fig. 2, as later described, or in any other suitable manner. Any other desired diagonal or other stiffening frame members may be used.

In connection with the foregoing it may be pointed out that the portion of the casing 7 between the pivot bolt 12 and the axis of the torsion rod 25 acts as a link, lying approximately parallel to, and cooperating with, the lower link 21—23—22 to provide a parallel motion mechanism for connecting the front wheel supporting bracket 13 with the weight bearing members. These parts should be made of ample dimensions to hold the front wheels in line and support all lateral strains, but at the same time they provide for the necessary up and down movements of the chassis frame relatively to the wheels.

Figure 2:
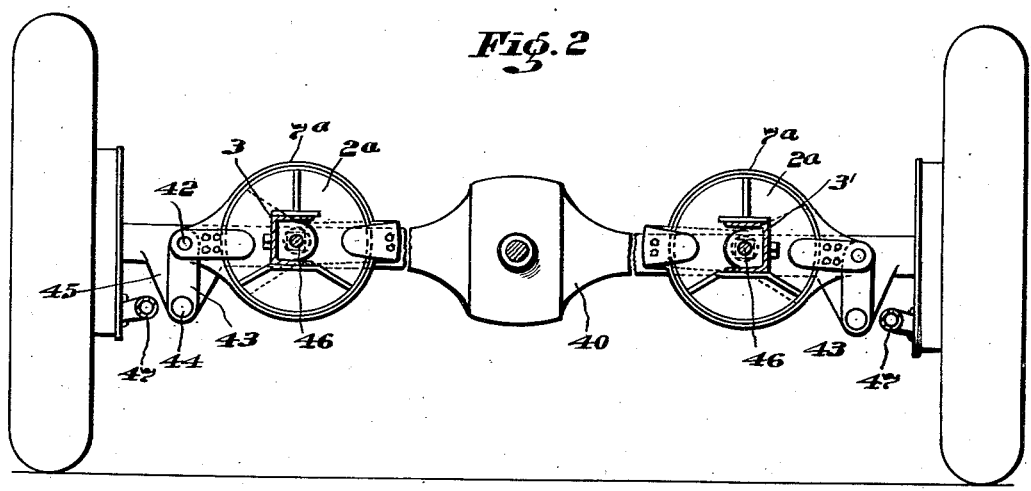
Fig. 2 is a vertical, sectional view through the rearward portion of the frame, the plane of section being in front of the rear wheels so that these parts and the rear axle appear in elevation.
Figure 3:
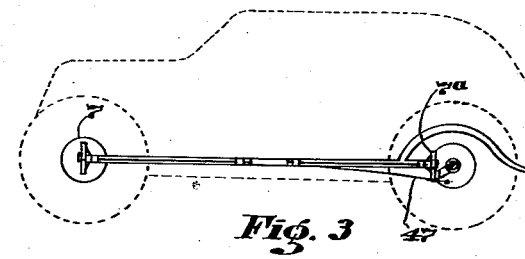
Fig. 3 is a diagrammatic view of the vehicle body and chassis.

Preferably a similar arrangement is used at the rear end of the frame to connect it with the rear axle housing. Such a construction is illustrated in Fig. 2. Referring to the left-hand side of this figure it will be seen that a disk 2a, like the disk 2, is secured rigidly to the rearward end of the side channel bar 3, and that a casing member 7a cooperates with it in the same manner as in the construction at the front of the frame. This casing member is provided with a laterally extending arm which is pivoted at 42 to the upper end of a strut or arm 43, the lower end of which is secured rigidly at 44 to a hanger 45 integral with the rear axle housing. The hanger corresponds functionally to the bracket 13. A torsion spring 46 is connected to the casing member 7a in the same manner that the parts 25 and 7 are connected. In all functional respects this mechanism operates like that at the front right-hand corner of the frame. Likewise the parts shown at the left-hand side of Fig. 2 are duplicated at the right-hand side and operate in the same manner. Torsion bars 47—47 connect the opposite ends of the rear axle housing to the frame.

It will be evident from the foregoing that the invention provides an exceedingly simple chassis construction. At the same time it is sturdy, reliable, and not likely to get out of order. By suitably designing the parts and properly selecting the materials used, the springing necessary to easy riding may be attained. Adjustments desirable to meet different conditions, or to adapt the vehicle to the requirements of different users also are provided. In addition, the arrangement is such that a shorter chassis construction can be used with less adverse effect on the riding qualities than in the conventional types of motor vehicles. It will also be observed that if the torsion bar should break due to crystallization, or for any other reason, the disks 2 and 7 would still be held in their normal operative relationship to each other as shown in Fig. 4, and the frame could only drop a very short distance before the flanges 5 would strike the links 24 and prevent any further downward movement of the front axle. Only a very limited drop of the rearward end of the body also would be permitted. Consequently, even if any spring should fail, the car could still be operated.

While I have herein shown and described a typical embodiment of my invention, it will be understood that the invention may be embodied in other forms without departing from the spirit or scope thereof and that it is useful in a wide variety of types of vehicles. For example, the disk 2 and the casing 7 obviously may take other forms while still performing essentially the same functions, and changes in design necessarily will be made in these, and other parts, in accordance with the requirements of individual situations.

Having thus described my invention, what I desire to claim as new is:

1. In a vehicle chassis, the combination of a frame, a disk secured to said frame, a casing closely encircling said disk, said disk providing a bearing for said casing on which the latter is mounted for rotative movement, a rod secured at one end to said frame and connected with said casing to torsionally resist said rotative movement, and means for operatively connecting said casing with the support for one of the wheels on which the frame is mounted and through which the wheel supports part of the weight of the frame, said disk and said casing being so related as to transmit weight from the frame through said connecting means.

2. In a vehicle chassis, the combination of a frame, a disk secured to said frame, a casing closely encircling said disk, said disk providing a bearing for said casing on which the latter is mounted for rotative movement and to which weight of the frame is transmitted by said disc, a rod secured at one end to said frame and connected with said casing to torsionally resist said rotative movement, a support for one of the wheels on which said frame is mounted and through which the wheel supports the frame, and a pivotal connection between said casing and said support affording relative vertical movement between said casing and said support.

3. In a vehicle chassis, the combination of a frame, a disk secured to said frame, a casing closely encircling said disk, said disk providing a bearing for said casing on which the latter is mounted for rotative movement, a rod carried by said frame and connected with said casing to torsionally resist said rotative movement, a supporting member for one of the chassis wheels and through which said wheel assists in supporting the frame, and means for operatively connecting said casing with the foregoing parts, said means including parallel motion links but providing for relative vertical movement between said wheel and said frame.

4. In a vehicle chassis, the combination of a frame, a disk secured to said frame, a casing closely encircling said disk, said disk providing a bearing for said casing on which the latter is mounted for rotative movement, said casing including means for holding it both in face to face and also in peripheral engagement with said disk, a rod secured to said frame and connected with said casing to torsionally resist said rotative movement, a member for supporting one of the wheels on which the frame is mounted, and means for operatively connecting said casing and said member together to cause vertical movement of one relatively to the other to produce said rotative movement of said casing.

5. In a vehicle chassis, the combination with a frame, of means connecting said frame operatively to one of the wheels for supporting the frame thereon, said means comprising a disk secured to the frame, a casing mounted on said disk for rotative movement thereon, said casing and said disk being constructed and arranged to maintain themselves against substantial relative movement in all directions except said rotative movement, a torsion rod secured at one end to said frame and connected at its opposite end with said casing to torsionally resist said rotative movement, a supporting member for said wheel and through which the wheel assists in supporting the frame, and means for operatively connecting said member and said casing together to cause relative vertical movement of them to produce a rotative movement of said casing on said disk.

6. In a vehicle chassis, the combination with a frame, of means connecting said frame operatively to one of the wheels for supporting it, said means comprising a disk secured to the frame, a casing mounted on said disk for rotative movement thereon, said casing and said disk being constructed and arranged to maintain themselves against substantial relative movement in all directions except said rotative movement, means for pressing said casing and said disk together in frictional relationship to each other, said means being adjustable to vary the frictional resistance between said parts, a torsion rod carried by said frame and connected with said casing to torsionally resist said rotative movement, a supporting member for said wheel, and means for operatively connecting said member and said casing together to cause relative vertical movement of them to produce a rotative movement of said casing on said disk.

7. In a vehicle chassis, the combination with a frame, of means connecting said frame operatively to one of the wheels for supporting the frame thereon, said means comprising a disk secured to the frame, a casing mounted on said disk for rotative movement thereon, said casing and said disk being constructed and arranged to maintain themselves against substantial relative movement in all directions except said rotative movement whereby said disk transmits the load carried by it to said casing, a rod extending longitudinally of the frame and housed in a side channel bar of the frame, said rod being connected with said casing to torsionally resist said rotative movement of the casing, a supporting member for said wheel, and means for operatively connecting said member and said casing together to transmit the weight of the casing to said wheel and to cause relative vertical movement of them to produce a rotative movement of said casing on said disk.

8. In a vehicle chassis, the combination with a frame, of means connecting said frame operatively to one of the wheels for supporting the frame thereon; said means comprising a disk rigid with the frame, a casing mounted on said disk for rotative movement around the axis of the disk, means holding said casing and said disk together in frictional relationship to each other and against movement, one relative to the other, in all directions except that required by said rotative movement, means adjustable to vary the frictional resistance of said casing and said disk on each other during said rotative movement, a torsion rod secured at one end to said frame and connected at its opposite end to said casing to resist said rotative movement, and means for operatively connecting said casing with said wheel to transmit weight from the casing to the wheel and to cause vertical movement of said frame relatively to said wheel to produce said rotative movement of said casing on said disk against the torsional resistance of said rod.

9. A motor vehicle comprising a chassis frame, means connecting said frame operatively to one of the vehicle wheels for supporting the frame thereon; said means comprising a disk rigid with the frame, a casing mounted on said disk for rotative movement around the axis of the disk, means for holding said casing and said disk together against movement, one relatively to the other, in all directions except that of said rotative movement whereby said casing supports the weight of said disk and parts mounted thereon, a torsion rod secured at one end to said frame and connected at its opposite end to said casing to torsionally resist said rotative movement, a supporting member for said wheel and through which the wheel aids in supporting the frame, and means for operatively connecting said member and said casing together to cause vertical movement of said frame relatively to said wheel to produce a rotative movement of said casing on said disk and against the torsional resistance of said rod.

10. A motor vehicle comprising a chassis frame, two disks secured to said frame at one end thereof, two casings mounted on said disks, respectively, for rotative movement around the axes of the respective disks, means holding each casing to its respective disk and against movement relatively thereto, except said rotative movement, whereby the weight of said end of the frame is transmitted through said disks to said casings, right and left wheels at said end of the frame to support it, means connecting said casings with said wheels to transmit the weight of the frame to the wheels, said connecting means being constructed and arranged to cause vertical movement of the frame relatively to the wheels to produce rotative movement of said casings around the axes of their respective disks, and two torsion rods secured to said frame and connected with said respective casings to torsionally resist said rotative movements.

SAMUEL ELIOT.